(12) United States Patent
Kamioka et al.

(10) Patent No.: US 7,664,399 B2
(45) Date of Patent: Feb. 16, 2010

(54) OPTICAL COMMUNICATION DEVICE

(75) Inventors: Shinji Kamioka, Kawasaki (JP);
Yuuichi Hashimoto, Kawasaki (JP);
Kazukiyo Ogawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 534 days.

(21) Appl. No.: 11/476,056

(22) Filed: Jun. 28, 2006

(65) Prior Publication Data
US 2007/0230959 A1    Oct. 4, 2007

(30) Foreign Application Priority Data
Mar. 31, 2006  (JP) .............................. 2006-096313

(51) Int. Cl.
*H04J 14/00*    (2006.01)
*H04J 14/02*    (2006.01)
(52) U.S. Cl. .............................. 398/79; 398/43; 398/93
(58) Field of Classification Search .................. 398/79, 398/82, 43, 93, 158
See application file for complete search history.

(56) References Cited
U.S. PATENT DOCUMENTS
6,282,361 B1    8/2001  Nishimura et al.

2003/0026581 A1*  2/2003  Sharp et al. .................. 385/140
2006/0001935 A1*  1/2006  Drake ............................ 359/13
2006/0147205 A1*  7/2006  Raddatz ....................... 398/30

* cited by examiner

*Primary Examiner*—M. R Sedighian
(74) *Attorney, Agent, or Firm*—Staas & Halsey LLP

(57) ABSTRACT

An optical communication device whereby optical attenuation characteristics are linearized to suppress optical level variations among wavelengths attributable to the attenuation characteristics and thereby enable long-distance transmission. Optical attenuators attenuate optical signals of respective wavelengths in accordance with optical attenuation data output from a control data converter. An optical multiplexer multiplexes the optical signals, and an optical amplifier amplifies the multiplexed signal. A control data output unit outputs optical signal control data based on differences between a set optical level and the optical levels of respective wavelengths input to the optical amplifier. A data table holds data for converting the optical signal control data to the optical attenuation data so that the optical attenuation amounts of the attenuators may be linearized with respect to the optical signal control data. A control data converter looks up the data table to convert the optical signal control data to the optical attenuation data.

6 Claims, 18 Drawing Sheets

| VOA DRIVING CURRENT | DIFFERENCE IN OPTICAL ATTENUATION |
|---|---|
| 9-10[mA] | 2.0[dB] |
| 24-25[mA] | 1.5[dB] |
| 26-27[mA] | 0.5[dB] |

FIG. 18

OPTICAL COMMUNICATION DEVICE

CROSS-REFERENCE TO RELATED APPLICATIONS

This application is based upon and claims the benefits of priority from the prior Japanese Patent Application No. 2006-096313, filed on Mar. 31, 2006, the entire contents of which are incorporated herein by reference.

BACKGROUND OF THE INVENTION

1. Field of the Invention

The present invention relates to optical communication devices, and more particularly, to an optical communication device for multiplexing optical signals for communication.

2. Description of the Related Art

In WDM (Wavelength Division Multiplexing) transmission, optical signals are controlled to a constant level by variable optical attenuators (hereinafter VOAs) before being output to a WDM transmission line. Thus, the optical attenuation characteristics of the VOAs are of importance.

FIG. 14 is a block diagram of a conventional optical communication device. As illustrated, the optical communication device comprises wavelength converter units 201a, 201b, . . . , 201n, VOAs 202a, 202b, . . . , 202n, an optical multiplexer (OPT-MUX) 203, an optical amplifier (WDM-AMP) 204, a filter 205, a photodiode (PD) 206, an A/D converter 207, a level comparator 208, an amplifier (AMP) setting unit 209, and a VOA controller 220. The VOA controller 220 includes a VOA control data generator 221, a D/A converter 222, and a VOA driver circuit 223. The figure also shows the optical levels of optical signals output from individual elements, wherein $\lambda 1$, $\lambda 2$, . . . , $\lambda n$ indicate the wavelengths of the respective optical signals.

The wavelength converter units 201a, 201b, . . . , 201n convert input signals, which are to be transmitted to a target of communication, to optical signals of respective wavelengths and output the resulting signals.

Under the control of the VOA controller 220, the VOAs 202a, 202b, . . . , 202n attenuate the optical signals output from the respective wavelength converter units 201a, 201b, . . . , 201n and output the resulting signals.

The optical multiplexer 203 multiplexes the optical signals output from the VOAs 202a, 202b, . . . , 202n and outputs the multiplexed signal.

The optical amplifier 204 amplifies the multiplexed optical signal output from the optical multiplexer 203, and outputs the amplified signal to a WDM transmission line, whereby the optical signal is transmitted to the target optical communication device.

The filter 205 separates the optical signal input to the optical amplifier 204 into signals of the respective wavelengths.

The photodiode 206 detects (as electrical signals) the optical levels of the optical signals of the respective wavelengths separated by the filter 205.

The A/D converter 207 subjects the optical levels detected by the photodiode 206 to analog-to-digital conversion.

The level comparator 208 compares a set value set by the AMP setting unit 209 with the individual signal values output from the A/D converter 207, and outputs the differences obtained to the VOA control data generator 221.

The AMP setting unit 209 is input with information including the number of wavelengths handled by the optical communication device, device configuration, etc. Based on the input information, the AMP setting unit 209 sets an optical level for the optical signals of the respective wavelengths to be input to the optical amplifier 204. The set optical level is output to the optical amplifier 204 and the level comparator 208.

The VOA control data generator 221 generates, based on the differences output from the level comparator 208, VOA control data for controlling the respective VOAs 202a, 202b, . . . , 202n.

The D/A converter 222 subjects the data output from the VOA control data generator 221 to digital-to-analog conversion.

Based on the analog signal output from the D/A converter 222, the VOA driver circuit 223 controls the VOAs 202a, 202b, . . . , 202n.

Namely, in the illustrated optical communication device, the level comparator 208 compares actual optical levels of the respective wavelengths input to the optical amplifier 204 with the optical level set by the AMP setting unit 209, and outputs the differences obtained to the VOA controller 220. The VOA controller 220 controls the VOAs 202a, 202b, . . . , 202n so that the respective differences may become "0" (zero). This permits the optical amplifier 204 to be input with optical signals with an optical level set by the AMP setting unit 209.

Meanwhile, a multichannel optical variable attenuator has been proposed whereby, even in the case where multi-wavelength signal beams develop an output tilt due to the transmission characteristics of the optical fiber transmission line or due to the gain tilt of the optical amplifier, the output tilt can be collectively compensated for with the use of a simple construction and control so that the individual powers of the multi-wavelength signal beams may be kept nearly constant (e.g., Unexamined Japanese Patent Publication No. 2000-180803).

Even in this attenuator, the optical levels of respective wavelengths are subject to variations attributable to the VOA characteristics, causing differences in dynamic range between the optical levels of the respective wavelengths. Consequently, the distance over which a certain wavelength with the smallest dynamic range can be transmitted determines the transmission distance of the WDM system, giving rise to the problem that the transmission distance of optical signals shortens.

FIG. 15 illustrates variations in the optical level among wavelengths. In the figure, parts A to D, which correspond to the respective sections indicated by the same letters in FIG. 14, respectively indicate the output optical levels of the wavelength converter units 201a, 201b, . . . , 201n, the output optical levels of the VOAs 202a, 202b, . . . , 202n, the output optical level of the optical multiplexer 203, and the output optical level of the optical amplifier 204, all appearing in FIG. 14.

As shown in the part A of FIG. 15, the optical signals output from the wavelength converter units 201a, 201b, . . . , 201n have optical levels varying according to wavelengths. The optical levels are adjusted by the VOAs 202a, 202b, . . . , 202n as shown in the part B, and then the optical signals of the respective wavelengths are multiplexed by the optical multiplexer 203, inclusive of variations attributable to the VOAs 202a, 202b, . . . , 202n, as shown in the part C. Subsequently, as shown in the part D, the multiplexed signal is amplified, together with the input variations, by the optical amplifier 204.

Variations in the optical level among the wavelengths can be suppressed to a certain degree through the control of the VOAs 202a, 202b, . . . , 202n, but the optical level variations still remain because of the individual characteristics of the VOAs. If the input to the optical amplifier 204 involves wavelength-dependent variations of optical levels, the optical level variations also are amplified and output. Consequently, the transmission distance is determined by the lowest of the input levels input to the optical amplifier 204, with the result that the transmission distance shortens.

For example, let us suppose the variations of the optical levels input to the optical amplifier 204 are so large that the average output optical level among the wavelengths is 2.0 dBm/ch while the lowest level is 0 dBm. In this case, the transmission distance is dependent on the lowest level of 0 dBm. A 2.0-dB loss of the output optical level of the optical amplifier 204 results in shortening of the transmission distance by 10 km on the assumption that the optical fiber has a transmission loss of 0.2 dB/km.

FIG. 16 shows an exemplary VOA characteristic, Wherein it is assumed that the optical attenuation by means of the VOAs 202a, 202b, ..., 202n can be controlled, for example, in 1 mA steps. As seen from the figure, where the VOA driving current is varied from 9 mA to 10 mA, the amount of optical attenuation changes by 2.0 dB.

FIG. 17 shows, in enlargement, the part of the VOA characteristic close to a minimum loss shown in FIG. 16. As seen from the figure, where the VOA driving current is varied from 26 mA to 27 mA, the optical attenuation amount changes by 0.5 dB.

FIG. 18 shows changes in the optical attenuation amount relative to changes in the VOA driving current. Even for a 1-mA change of the VOA driving current, the consequent change of the optical attenuation amount differs depending on the magnitude of the VOA driving current, as explained above with reference to FIGS. 16 and 17. Thus, in a region where the optical attenuation amount sharply varies, the optical attenuation amount cannot be set to the expected value.

Namely, the VOA characteristic includes a region where the optical attenuation amount sharply varies (the gradient is large) and a region where the optical attenuation amount gently varies (the gradient is small), as shown in FIGS. 16 to 18, which leads to variations in the optical level among wavelengths.

SUMMARY OF THE INVENTION

The present invention was created in view of the above circumstances, and an object thereof is to provide an optical communication device whereby VOA characteristics are linearized to suppress optical level variations attributable to the VOA characteristics and thereby enable long-distance transmission.

To achieve the object, there is provided an optical communication device for multiplexing optical signals for communication. The optical communication device comprises a plurality of optical attenuators for attenuating the optical signals of respective wavelengths in accordance with optical attenuation data, an optical multiplexer for multiplexing the optical signals, an optical amplifier for amplifying the multiplexed optical signal, a control data output unit for outputting optical signal control data based on differences between a set optical level and optical levels of the respective wavelengths input to the optical amplifier, a data table holding data for converting the optical signal control data to the optical attenuation data so that optical attenuation amounts of the optical attenuators may be linearized with respect to the optical signal control data, and a control data converter adapted to look up the data table, for converting the optical signal control data to the optical attenuation data and outputting the obtained data to the optical attenuators.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 18 shows changes in optical attenuation amount relative to changes in VOA driving current.

DESCRIPTION OF THE PREFERRED EMBODIMENTS

The principles of the present invention will be described first.

Figure 1:
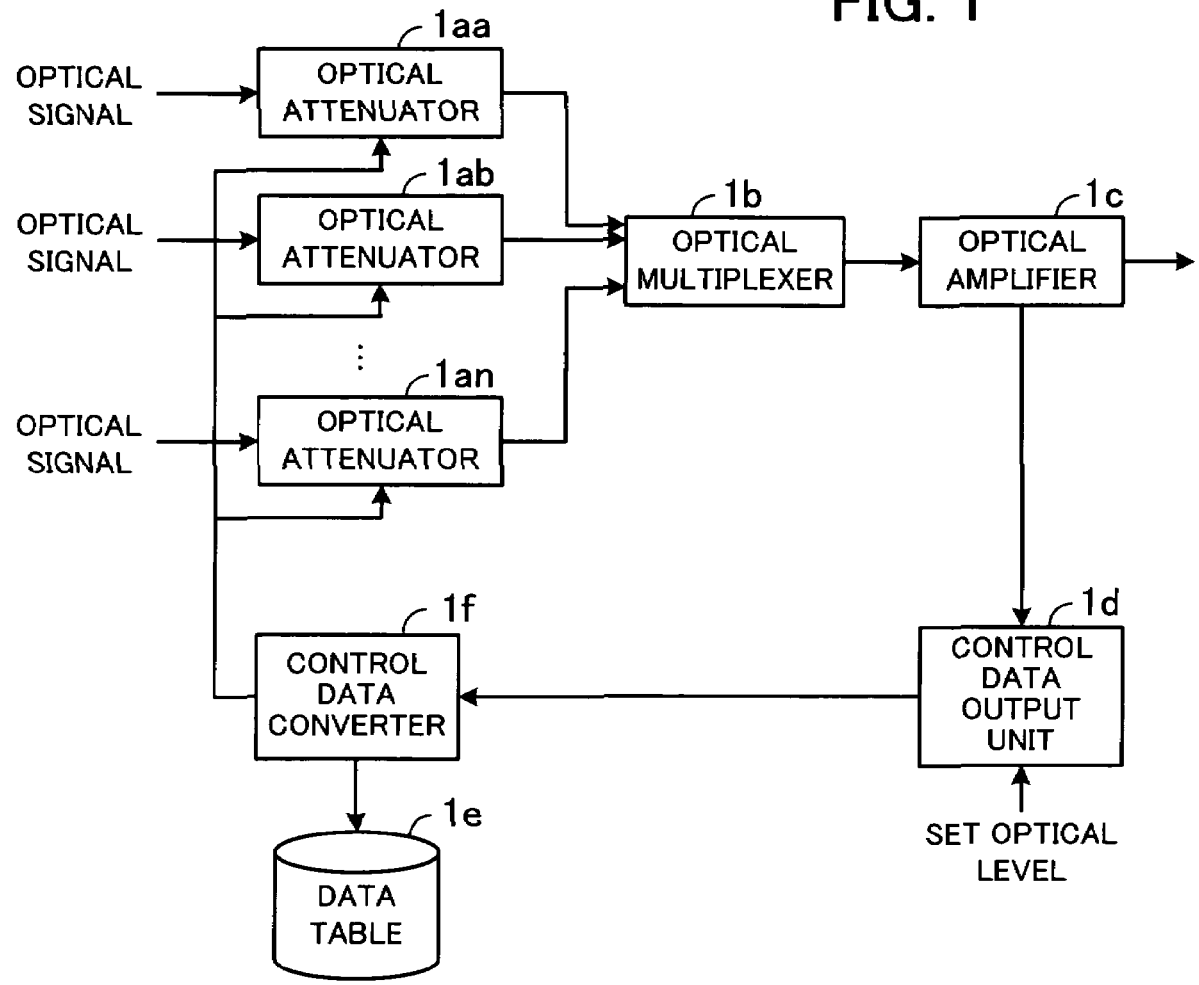
FIG. 1 schematically illustrates an optical communication device.

FIG. 1 schematically shows an optical communication device. As illustrated, the optical communication device comprises optical attenuators 1aa, 1ab, ..., 1an, an optical multiplexer 1b, an optical amplifier 1c, a control data output unit 1d, a data table 1e, and a control data converter 1f.

The optical attenuators 1aa, 1ab, ..., 1an attenuate optical signals of respective wavelengths in accordance with optical attenuation data output from the control data converter 1f.

The optical multiplexer 1b multiplexes the optical signals output from the respective optical attenuators 1aa, 1ab, ..., 1an.

The optical amplifier 1c amplifies the multiplexed optical signal output from the optical multiplexer 1b.

The control data output unit 1d outputs a plurality of optical signal control data based on the differences between a set optical level and the optical levels of the respective wavelengths input to the optical amplifier 1c.

The data table 1e holds data for converting the optical signal control data to optical attenuation data so that the optical attenuation amounts of the optical attenuators 1aa, 1ab, . . . , 1an may be linearized with respect to the optical signal control data.

The control data converter 1f looks up the data table 1e to convert the optical signal control data to the optical attenuation data, and outputs the obtained data to the optical attenuators 1aa, 1ab, . . . , 1an.

Thus, the optical communication device is provided with the data table 1e for converting the optical signal control data to the optical attenuation data so that the optical attenuation amounts of the optical attenuators 1aa, 1ab, . . . , 1an may be linearized with respect to the optical signal control data based on the differences between the set optical level and the optical levels of the respective wavelengths input to the optical amplifier 1c. The data table 1e is looked up to convert the optical signal control data to the optical attenuation data, and the data obtained is output to the optical attenuators 1aa, 1ab, . . . , 1an. Since the optical attenuation amounts of the optical attenuators 1aa, 1ab, . . . , 1an vary linearly with respect to the optical signal control data, wavelength-dependent variations of the optical levels output from the optical attenuators 1aa, 1ab, . . . , 1an can be suppressed, thus enabling long-distance transmission.

A first embodiment of the present invention will be now described in detail with reference to the drawings.

Figure 2:
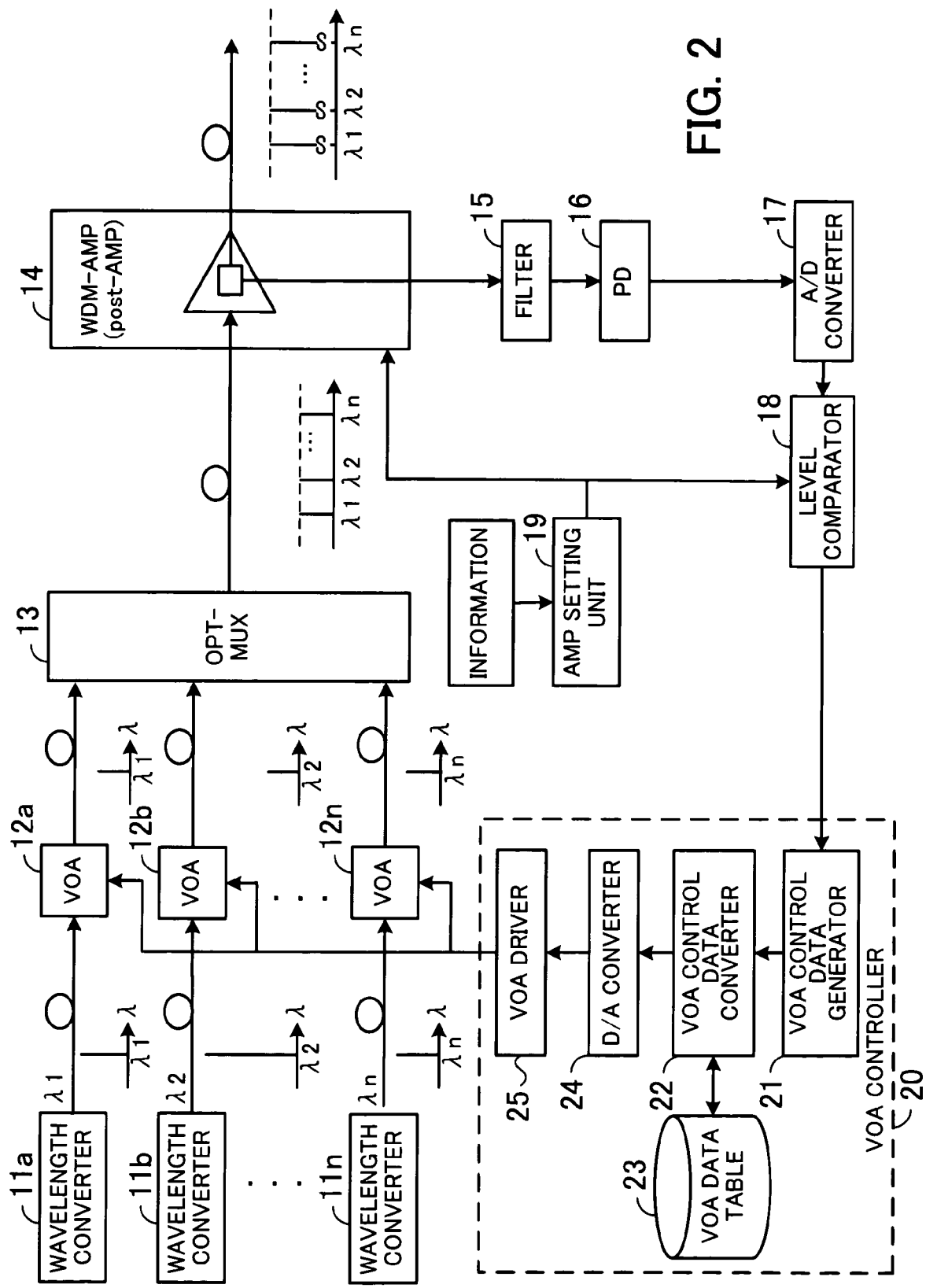
FIG. 2 is a block diagram of an optical communication device according to a first embodiment.

FIG. 2 is a block diagram of an optical communication device according to the first embodiment. As shown in the figure, the optical communication device comprises wavelength converter units 11a, 11b, . . . , 11n, VOAs 12a, 12b, . . . , 12n, an optical multiplexer 13, an optical amplifier 14, a filter 15, a photodiode 16, an A/D converter 17, a level comparator 18, an AMP setting unit 19, and a VOA controller 20. The VOA controller 20 includes a VOA control data generator 21, a VOA control data converter 22, a VOA data table 23, a D/A converter 24, and a VOA driver circuit 25. The figure also shows the optical levels of optical signals output from individual elements, wherein $\lambda 1, \lambda 2, \ldots, \lambda n$ represent the wavelengths of the respective optical signals.

The wavelength converter units 11a, 11b, . . . , 11n convert input signals, which are to be transmitted to a target of communication, to optical signals of respective wavelengths and output the resulting signals.

Under the control of the VOA controller 20, the VOAs 12a, 12b, . . . , 12n attenuate the optical signals output from the respective wavelength converter units 11a, 11b, . . . , 11n and output the resulting signals.

The optical multiplexer 13 subjects the optical signals output from the VOAs 12a, 12b, . . . , 12n to wavelength division multiplexing and outputs the multiplexed signal.

The optical amplifier 14 amplifies the multiplexed optical signal output from the optical multiplexer 13, and outputs the amplified signal to a WDM transmission line, whereby the optical signal is transmitted to the target optical communication device.

The filter 15 separates the optical signal input to the optical amplifier 14 into signal of the respective wavelengths.

The photodiode 16 subjects the optical signals of the respective wavelengths separated by the filter 15 to photoelectric conversion, to detect the optical levels of the individual wavelengths as electrical signals, and outputs the resulting signals.

The A/D converter 17 subjects the optical levels detected by the photodiode 16 to analog-to-digital conversion.

The level comparator 18 compares a set value set by the AMP setting unit 19 with the individual signal values output from the A/D converter 17, and outputs the differences obtained to the VOA control data generator 21.

The AMP setting unit 19 is input with information including the number of wavelengths handled by the optical communication device, device configuration, etc. Based on the input information, the AMP setting unit 19 sets an optical level for the optical signals of the respective wavelengths to be input to the optical amplifier 14. The set optical level is output to the optical amplifier 14 and the level comparator 18.

The VOA control data generator 21 generates, based on the differences output from the level comparator 18, VOA control data for controlling the respective VOAs 12a, 12b, . . . , 12n.

The VOA control data converter 22 looks up the VOA data table 23, to convert the VOA control data output from the VOA control data generator 21.

The VOA data table 23 holds data for converting the VOA control data so that the optical attenuation amounts of the VOAs 12a, 12b, . . . , 12n may be linearized (like a first-order curve) with respect to the VOA control data.

The D/A converter 24 subjects the converted VOA control data output from the VOA control data converter 22 to digital-to-analog conversion.

Based on the analog signal output from the D/A converter 24, the VOA driver circuit 25 controls the VOAs 12a, 12b, . . . , 12n.

Thus, in the illustrated optical communication device, the level comparator 18 compares actual optical levels of the individual wavelengths input to the optical amplifier 14 with the optical level set by the AMP setting unit 19, and outputs the differences obtained to the VOA control data generator 21. Based on the differences, the VOA control data generator 21 generates VOA control data for controlling the VOAs 12a, 12b, . . . , 12n. The VOA control data is converted by the VOA control data converter 22 so that the optical attenuation amounts of the VOAs 12a, 12b, . . . , 12n may be linearized with respect to the VOA control data.

Consequently, the optical levels of the respective wavelengths $\lambda 1, \lambda 2, \ldots, \lambda n$ output from the VOAs 12a, 12b, . . . , 12n and input to the optical amplifier 14 can be restrained from varying, as seen from FIG. 2. Namely, the VOA characteristics are made linear to suppress variations in the optical level among the wavelengths attributable to the VOA characteristics, thereby enabling long-distance transmission of optical signals.

The VOA data table 23 appearing in FIG. 2 will be now described in detail. The VOA data table 23 has two states, that is, a state before correction and a state after correction, as explained in detail below. Before the correction, the VOA data table 23 holds data for deriving an ordinary VOA characteristic, and after the correction, the VOA data table 23 holds data for linearizing the VOA characteristic.

Figure 3:
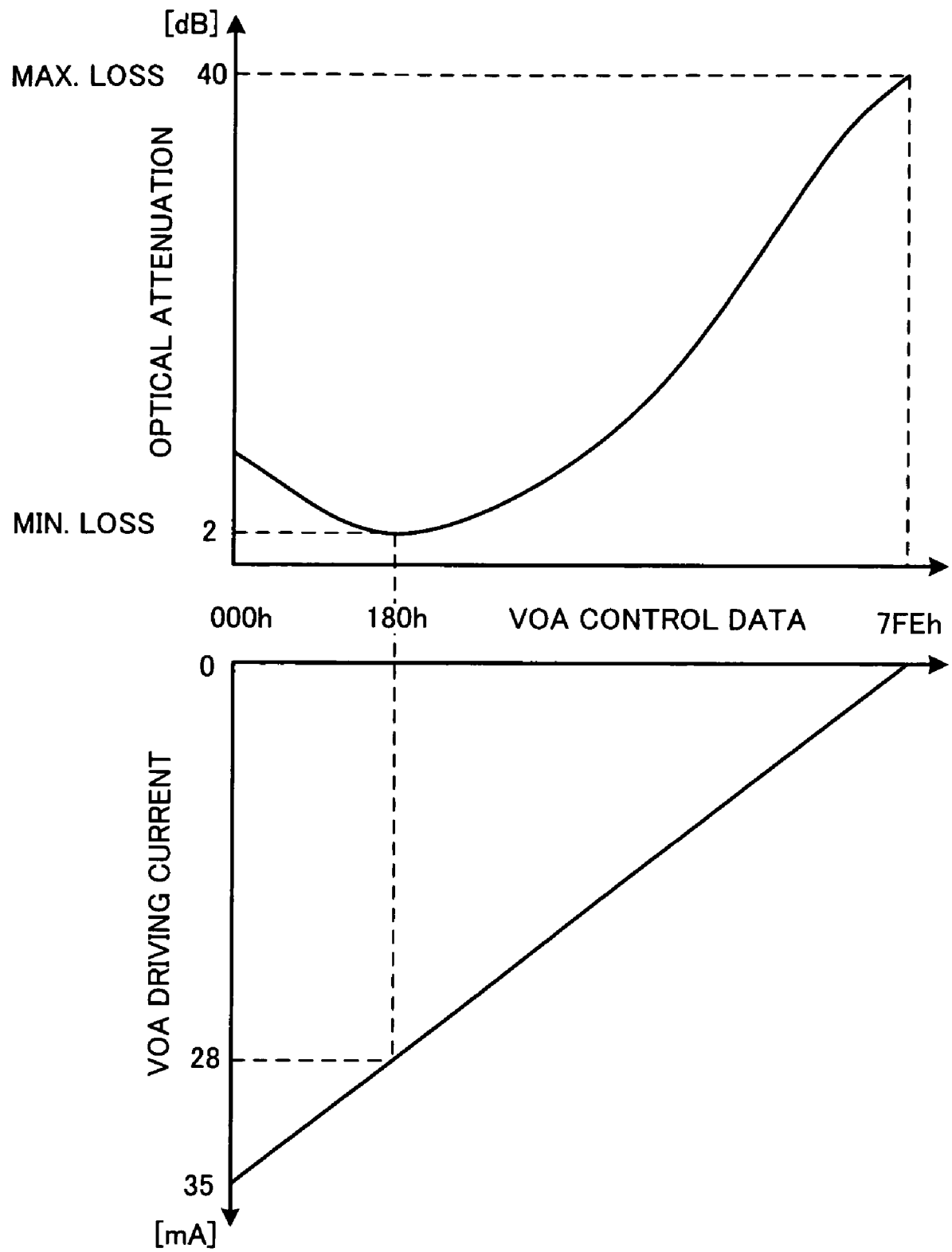
FIG. 3 illustrates a VOA characteristic before correction of a VOA data table.

FIG. 3 illustrates the VOA characteristic before the correction of the VOA data table. In the figure, the upper graph shows the relationship of the optical attenuation amount with respect to the VOA control data before the correction of the VOA data table 23, and the lower graph shows the relationship of the VOA driving current with respect to the VOA control data before the correction of the VOA data table 23.

Based on the differences output from the level comparator 18, the VOA control data generator 21 generates VOA control data in the range from 000h to 7FEh, as shown in FIG. 3. Thus, the VOA driver circuit 25 outputs the VOA driving current in the range from 0 mA to 35 mA, as shown in the lower graph.

Figure 16:
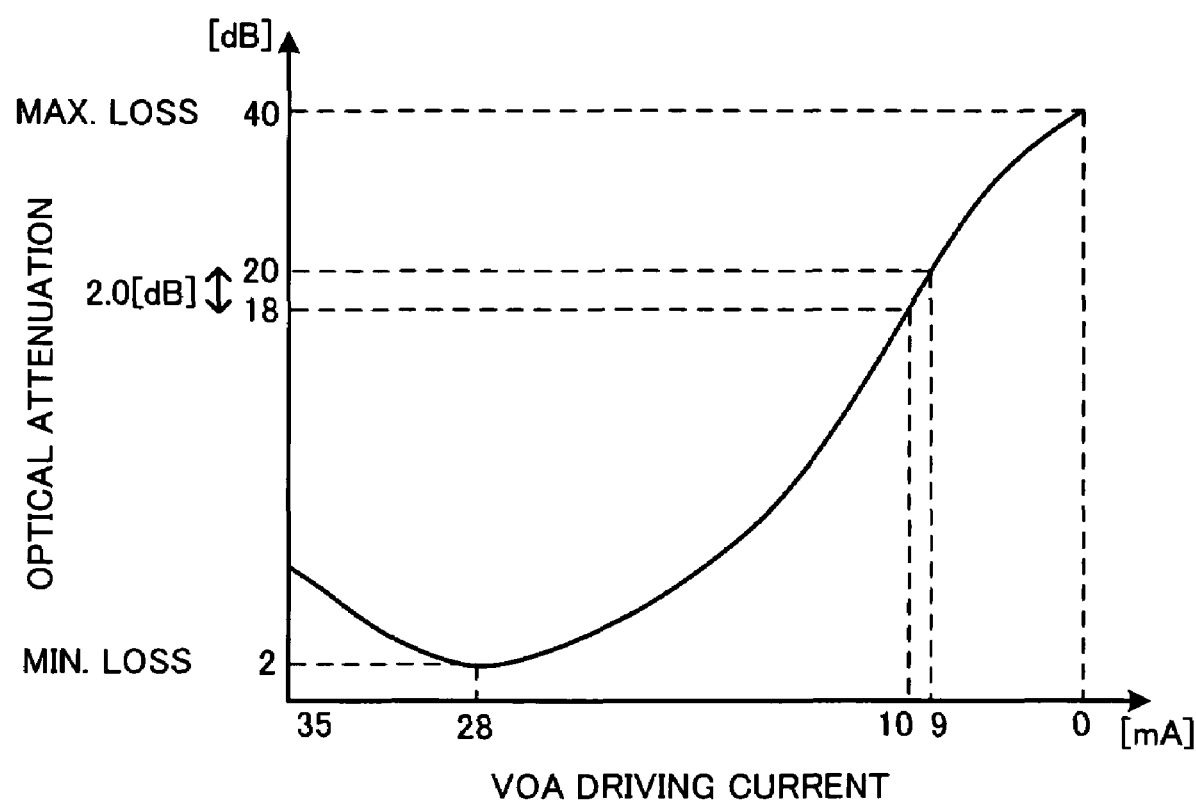
FIG. 16 shows an exemplary VOA characteristic.
Figure 17:
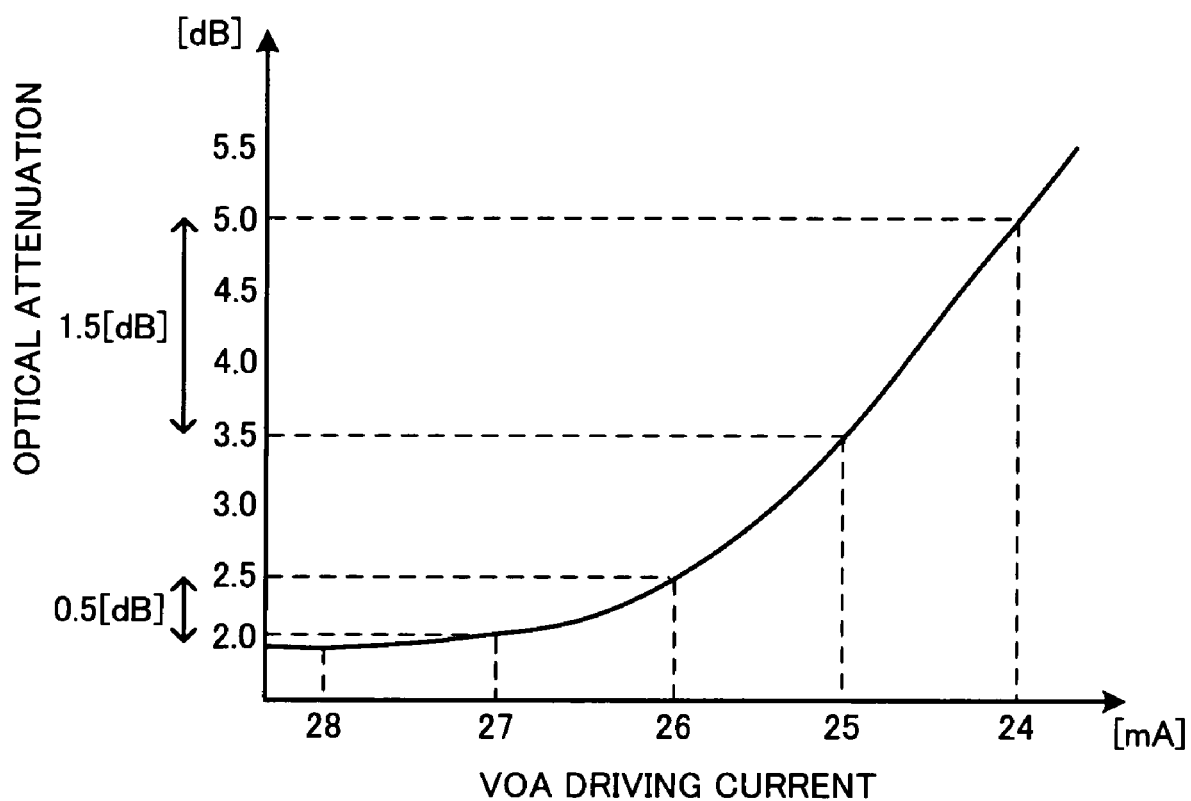
FIG. 17 shows, in enlargement, the part of the VOA characteristic close to a minimum loss shown in FIG. 16.

As seen from the upper graph, the VOA characteristic is identical with an ordinary one (identical with the characteristic shown in FIG. 16). As the VOA control data changes in the range from 000h to 7FEh, the VOA driving current is output in the manner shown in the lower graph, and in accordance with the output VOA driving current, the optical attenuation amount of the VOA varies in the manner shown in the upper graph.

Namely, before the correction, the VOA data table 23 holds conversion data (digital data) representing the VOA control data and the VOA driving current in a linear relationship. For example, the VOA data table 23 stores digital data for causing the VOA driver circuit 25 to output 35-mA VOA driving current when the VOA control data is at 000h, as well as digital data for causing the VOA driver circuit 25 to output 28-mA VOA driving current when the VOA control data is at 180h.

Figure 4:
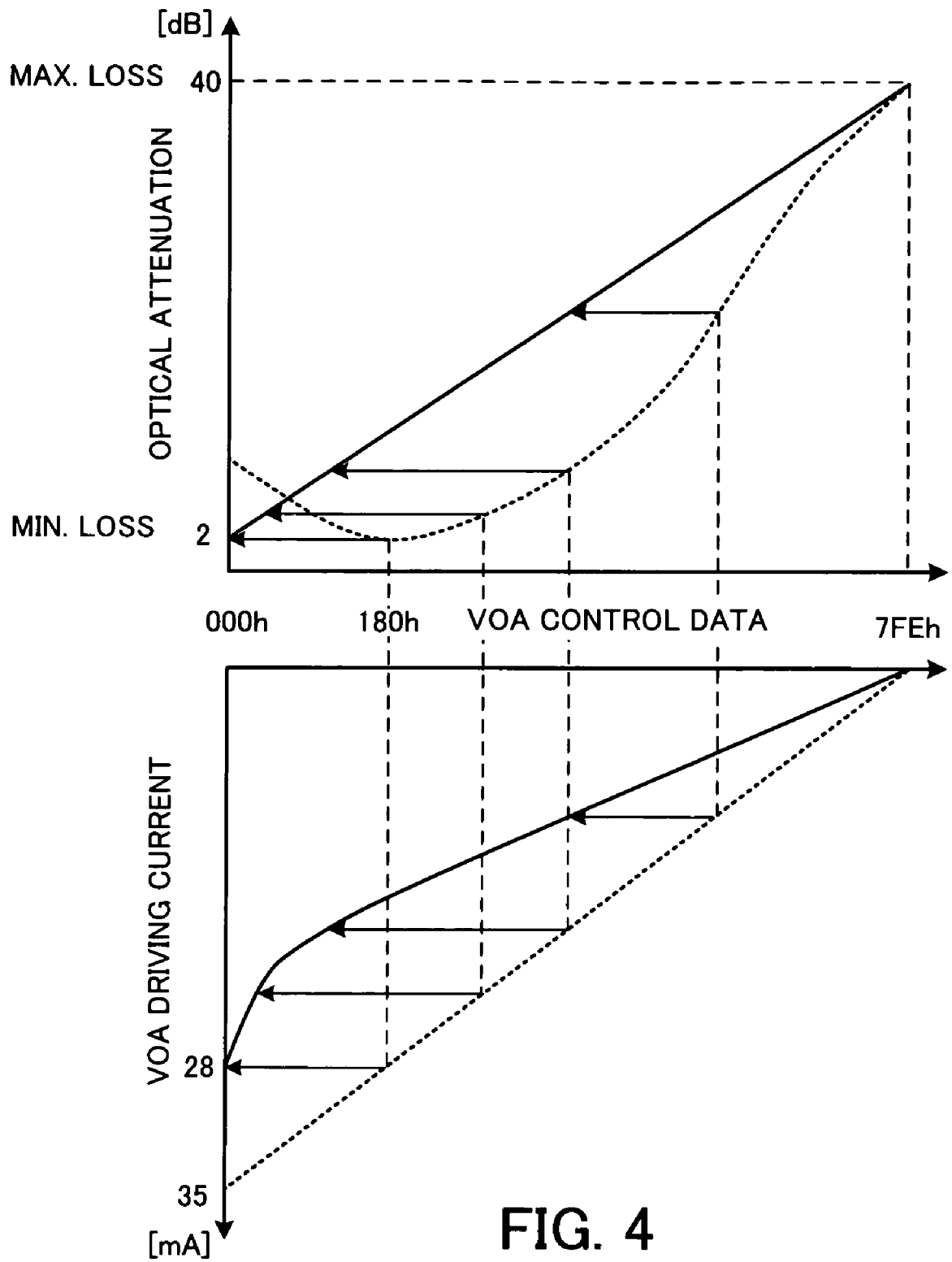
FIG. 4 illustrates the VOA characteristic after the correction of the VOA data table.

FIG. 4 illustrates the VOA characteristic after the correction of the VOA data table. In the figure, the upper graph shows the relationship of the optical attenuation amount with respect to the VOA control data after the correction of the VOA data table 23, wherein the dotted line indicates the relationship of the optical attenuation amount with respect to the VOA control data before the correction.

In FIG. 4, the lower graph shows the relationship of the VOA driving current with respect to the VOA control data after the correction of the VOA data table 23, wherein the dotted line indicates the relationship of the VOA driving current with respect to the VOA control data before the correction of the VOA data table 23.

Based on the differences output from the level comparator 18, the VOA control data generator 21 generates VOA control data in the range from 000h to 7FEh, as shown in FIG. 4. However, the VOA control data is converted by means of the VOA data table 23 so that the VOA driver circuit 25 may output the VOA driving current in the manner shown in the lower graph of FIG. 4. The thus-converted VOA control data is output to the D/A converter 24, and the VOA driver circuit 25 outputs the corresponding VOA driving current.

Namely, the VOA data table 23 stores digital data for outputting the VOA driving current as shown in the lower graph, with respect to the VOA control data (in FIG. 4, 000h to 7FEh) output from the VOA control data generator 21.

For example, the VOA data table 23 stores digital data for outputting 28-mA VOA driving current when the VOA control data is at 000h. In the aforementioned example shown in FIG. 3, 35-mA VOA driving current is output when the VOA control data is at 000h.

In this manner, the VOA control data is converted by means of the VOA data table 23 to obtain the linear optical attenuation characteristic shown in the upper graph of FIG. 4. In other words, the VOA data table 23 stores data for converting the VOA control data so that the VOA characteristic may be linearized. Consequently, the optical attenuation amount of the VOA varies at a constant rate (linearly) with respect to the VOA control data, thus making it possible to suppress variations in the optical level among wavelengths attributable to the VOA characteristics.

In a certain operating region of the conventional device, the optical attenuation amount increases even though the VOA control data is decreased, as seen from the upper graph of FIG. 3. For example, where the VOA control data is decreased across 180h, the optical attenuation amount stops decreasing and begins to increase. With the VOA data table 23, by contrast, the VOA characteristic is linearized, as shown in FIG. 4, and therefore, no inconsistency arises in the VOA control (the situation where the optical attenuation amount stops decreasing and begins to increase does not occur) when the VOA control data is varied from the maximum loss through to the minimum loss.

The following describes a tool for correcting the VOA data table 23, that is, a data measuring arrangement. This arrangement makes it possible to create VOA data tables matching the characteristics of individual VOAs.

Figure 5:
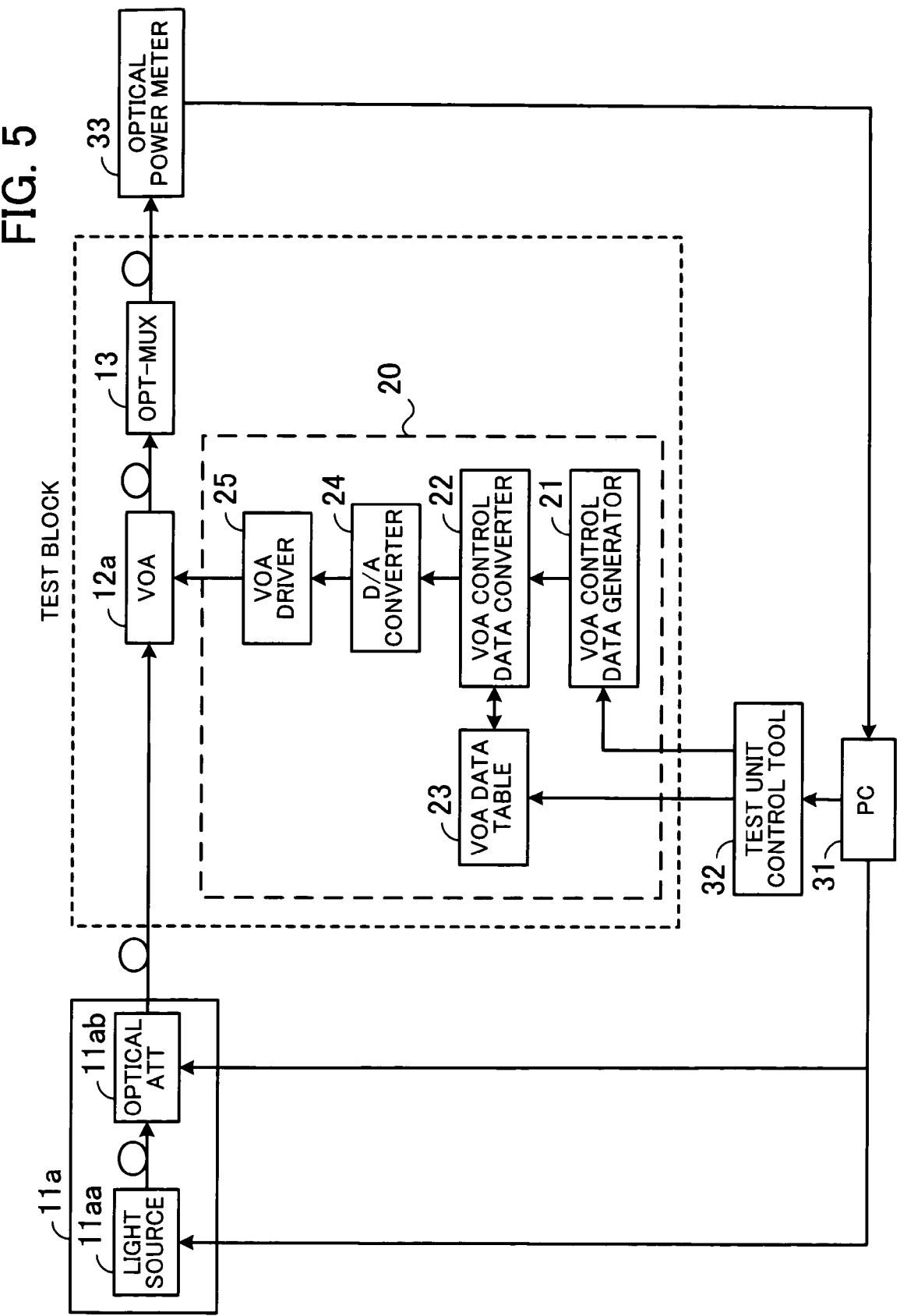
FIG. 5 illustrates a tool for correcting the VOA data table.

FIG. 5 illustrates the tool for correcting the VOA data table. In the figure are shown the wavelength converter unit 11a, the VOA 12a, the optical multiplexer 13 and the VOA controller 20, all appearing in FIG. 2, as well as a personal computer (PC) 31, a test unit control tool 32 and an optical power meter 33, which constitute the tool for correcting the VOA data table 23.

In the VOA data table 23, uncorrected data on the basis of which the optical attenuation characteristics of the VOAs 12a, 12b, . . . , 12n are to be linearized is stored.

The wavelength converter unit 11a includes a light source 11aa and an optical ATT (attenuator) 11ab. The light source 11aa and the optical ATT 11ab operate under the control of the personal computer 31 to output an optical signal with a predetermined optical level.

The optical signal output from the wavelength converter unit 11a is sent via the VOA 12a and the optical multiplexer 13 to the optical power meter 33. The optical power meter 33 outputs the optical level of the input optical signal to the personal computer 31.

The personal computer 31 controls a test block to be tested, by controlling the light source 11aa, the optical ATT 11ab and the test unit control tool 32, and acquires the optical attenuation characteristic of the VOA 12a. Then, based on the acquired VOA characteristic, the personal computer derives corrected data for the VOA data table 23.

For example, the personal computer 31 first stores, in the VOA data table 23, conversion data representing the VOA control data and the VOA driving current in a linear relationship, as shown in the lower graph of FIG. 3. Then, the personal computer 31 controls the optical level of the wavelength converter unit 11a, to acquire the characteristic of the VOA 12a as shown in the upper graph of FIG. 3. Based on the acquired characteristic of the VOA 12a, the personal computer 31 generates corrected data for the VOA data table 23, and writes the generated data in the VOA data table 23 through the test unit control tool 32.

In the above explanation, the VOA data table 23 is corrected by the tool external to the optical communication device. Needless to say, the function of the personal computer 31 may be incorporated in the optical communication device so that the optical communication device itself can correct the VOA data table 23. For example, the optical communication device may be equipped with hardware capable of performing the function of the personal computer 31 and the test unit control tool 32.

Further, although FIG. 5 exemplifies the tool arrangement whereby the optical attenuation characteristic of the VOA 12a is linearized, similar correction is also made with respect to the other VOAs 12b, . . . , 12n.

The correction of the VOA data table 23 will be now described in detail.

Figure 6:
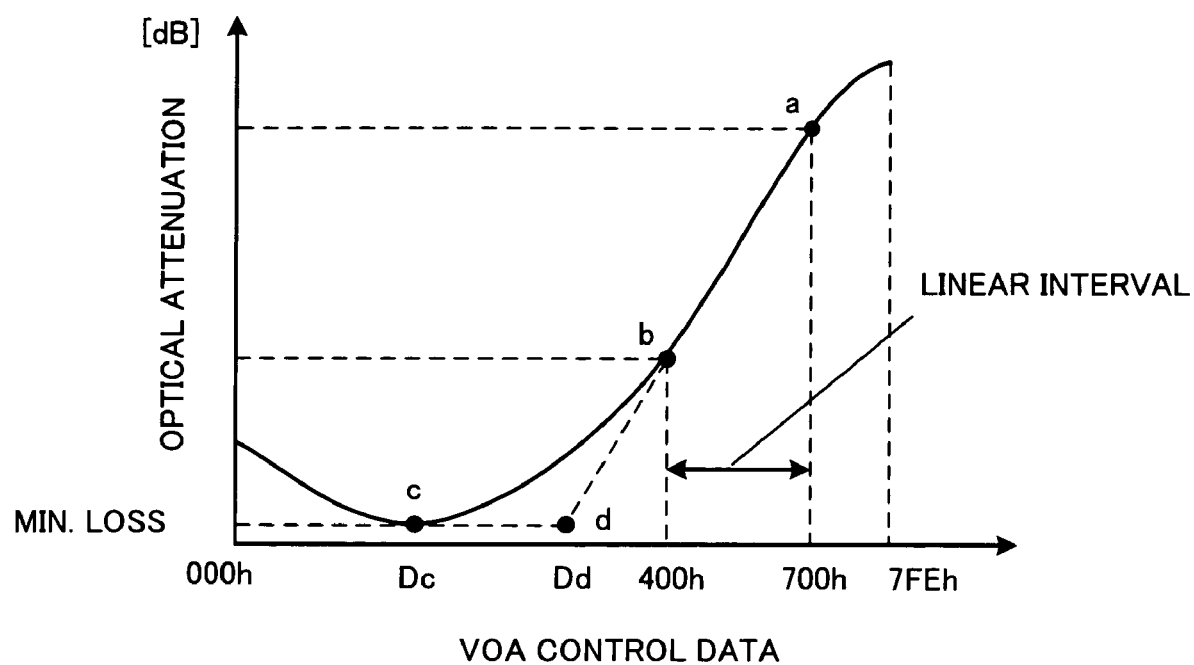
FIG. 6 illustrates the manner of correcting the VOA data table.
Figure 7:
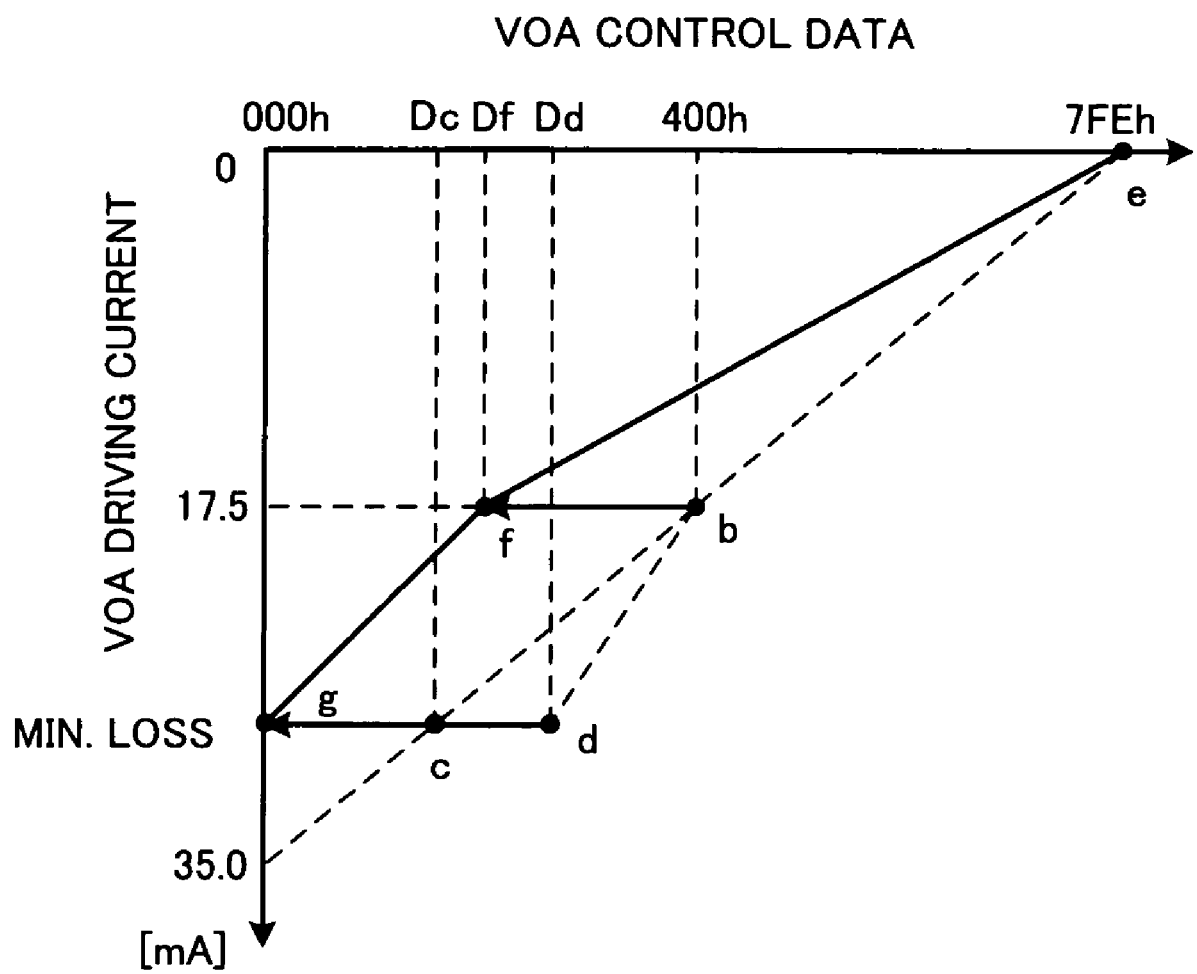
FIG. 7 also illustrates the manner of correcting the VOA data table.
Figure 8:
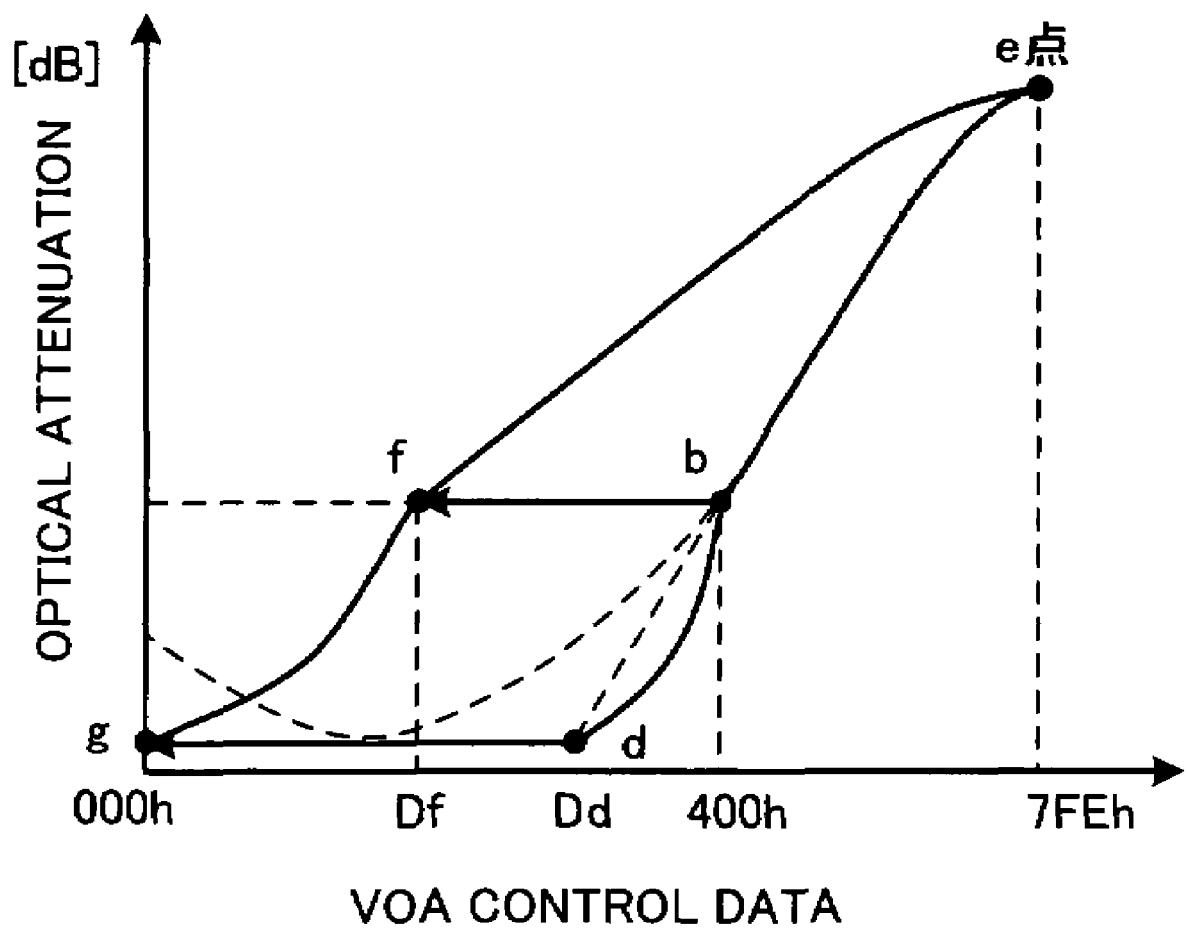
FIG. 8 also illustrates the manner of correcting the VOA data table.

FIGS. 6 to 8 illustrate the manner of how the VOA data table is corrected. As explained above with reference to FIG. 5, the personal computer 31 first writes, in the VOA data table 23, digital data (uncorrected data) representing the VOA control data and the VOA driving current in a linear relationship. Consequently, the VOA characteristic as shown in FIG. 6 is obtained.

Then, from the acquired VOA characteristic, the personal computer 31 obtains the optical attenuation amount corresponding to the minimum loss, the VOA control data corresponding to the minimum loss, and the VOA control data corresponding to each of the opposite points of an interval in which the VOA characteristic is in a straight line (linear). These items of data are hereinafter referred to as optical characteristic data.

For example, the personal computer 31 acquires the optical attenuation amount corresponding to the minimum loss, as well as VOA control data Dc corresponding to the minimum loss, from the characteristic shown in FIG. 6. Also, the personal computer acquires VOA control data 400h and 700h corresponding to the opposite points of the interval (in the figure, the interval between points a and b) where the VOA characteristic is in a straight line.

Based on the acquired optical characteristic data, the personal computer 31 extends the linear interval in which the VOA characteristic is in a straight line, to locate a point where the extended VOA characteristic intersects with the minimum loss. The personal computer 31 then obtains the VOA control data corresponding to the intersection point. Namely, linearity of the interval where the VOA characteristic is linear is utilized for correcting the VOA data table 23.

For example, the personal computer 31 extends the linear interval defined by the points a and b, and acquires a point d where the extended linear interval intersects with the minimum loss, as shown in FIG. 6. Then, the personal computer 31 acquires VOA control data Dd corresponding to the intersection point d. The optical attenuation characteristic shows the minimum loss at a point c, and the VOA control data corresponding to the point c is Dc.

If the VOA control data is converted so that the VOA may provide the minimum loss when the VOA control data is at Dd, the VOA characteristic is linearized at least with respect to the VOA control data in the range from Dd to 700h.

As shown in FIG. 7, for example, the data is corrected such that the point d (in FIGS. 6 to 8, the points a through g individually correspond to each other) corresponds to the minimum loss, and the opposite points b and d of the interval corresponding to the linear VOA characteristic are connected by a straight line, whereby conversion data for linearizing the VOA characteristic is obtained. In FIG. 7, the dashed line connecting the point e and the point corresponding to 35.0-mA VOA driving current indicates the relationship between the VOA control data and the VOA driving current before the correction. Since the conversion data is obtained by connecting the points b and d by a straight line, as shown in FIG. 7, the interval between the points b and d is not exactly linear but is somewhat curved, as shown in FIG. 8.

In the above method, the VOA characteristic is linearized with respect to the VOA control data in the range from Dd to 700h. In this case, however, the optical attenuation amount varies greatly in response to change in the VOA control data, making it impossible to carry out fine control. Accordingly, the data table is corrected so that the optical attenuation amount of the VOA can be finely controlled over the range from 000h to 7FEh. Specifically, the correction is made so that the VOA may exhibit the minimum loss when the VOA control data is at 000h and that 0-mA VOA driving current may be output when the VOA control data is at 7FEh.

For example, the personal computer 31 sets the point e so that 0-mA VOA driving current may be output when the VOA control data is at 7FEh, as shown in FIG. 7. Then, the point d is translated to the point g so that the VOA may provide the minimum loss when the VOA control data is at 000h. Further, the personal computer 31 translates the point b to the point f. The point f is so determined as to fulfill the relationship A/B=C/D, where A is the distance between the points e and f, B is the distance between the points e and b, C is the distance between the points f and g, and D is the distance between the points b and d.

Namely, the relationship between the VOA control data and the VOA driving current is expressed by using the points e, f and g connected to each other by a straight line, as shown in FIG. 7, whereby the VOA characteristic is linearized. In practice, however, since the points e, f and g are connected to each other by a straight line, the VOA characteristic is somewhat curved, as seen from the line e-f-g shown in FIG. 8.

Thus, by storing, in the VOA data table 23, the conversion data for converting the VOA control data in the range from 000h to 7FEh such the VOA driving current is output in the manner shown in FIG. 7, it is possible to cause the optical attenuation amount of the VOA to vary linearly with respect to the VOA control data.

Referring now to a flowchart, the correction of the VOA data table 23 will be explained.

Figure 9:
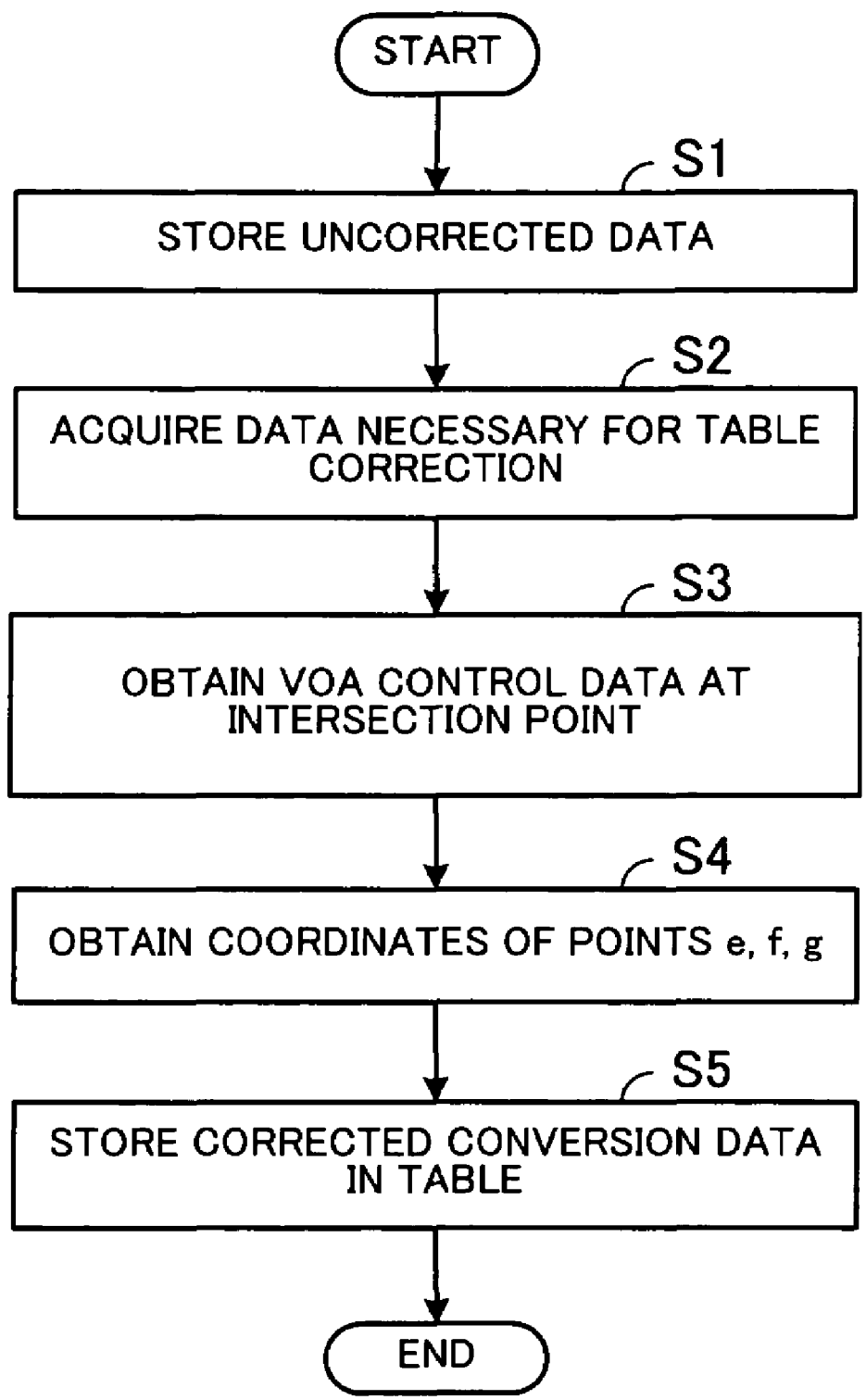
FIG. 9 is a flowchart illustrating a process for correcting the VOA data table.

FIG. 9 is a flowchart illustrating the process for correcting the VOA data table.

Step S1: Using the tool explained above with reference to FIG. 5, conversion data representing the VOA control data and the VOA driving current in a linear relationship, as shown in the lower graph of FIG. 3, for example, is stored in the VOA data table 23.

Step S2: The personal computer 31 acquires a VOA characteristic as shown in the upper graph of FIG. 3, and derives the optical characteristic data necessary for the creation of corrected data for the VOA data table 23.

Step S3: On the basis of the acquired optical characteristic data, the personal computer 31 plots a straight extension from the interval where the VOA characteristic is linear, as from the linear interval between the points a and b in FIG. 6, for example, and obtains the point d at which the straight extension intersects with the minimum loss, as well as the VOA control data Dd corresponding to the intersection point.

Step S4: To linearize the VOA characteristic, the personal computer 31 derives two subdivided intervals, namely, the interval from 400h to Dd and the interval from 400h to 7FEh, based on the VOA data table 23, and finds the gradients of the two intervals. Then, the personal computer 31 determines the coordinates of the points e, f and g such that the optical attenuation characteristic shows the minimum loss when the VOA control data is at 000h and that 0-mA VOA driving current is output when the VOA control data is at 7FEh.

Step S5: The personal computer 31 creates conversion data for converting the VOA control data such that the VOA control data in the range from 000h to 7FEh and the VOA driving current to be output are in the linear relationship derived by connecting the points e, f and g, as shown in FIG. 7, and stores the created conversion data in the VOA data table 23.

Thus, with the optical communication device, the VOA characteristics are linearized, whereby variations in the optical level among wavelengths attributable to the VOA characteristics can be suppressed, enabling long-distance transmission.

Also, since the VOA characteristics are linearized, the situation where the optical attenuation amount stops decreasing and then begins to increase does not occur even if the VOA control data is monotonically increased or decreased, and therefore, no inconsistency arises in the VOA control.

In WDM communications, optical signals may fail to be amplified enough to cover the required transmission distance if variations of the optical levels input to the optical amplifier 14 are large. This arises because the optical amplifier 14 is required to maintain the gain of the individual wavelengths constant by means of AGC (Automatic Gain Control), regardless of change in the number of input wavelengths, so that the output variations may be 3.0 dB or less. With the optical communication device of the present invention, the VOA characteristics are linearized to suppress variations in the optical level attributable to the VOA characteristics and thereby reduce variations of the optical levels input to the optical amplifier 14, whereby optical signals can be adequately amplified.

Further, the optical communication device performs tilt control for the purpose of compensating for primary tilt caused by WDL (Wavelength Dependent Loss) of the WDM transmission line and a Raman effect, and the amount of tilt control is +2.0 to 0.0 dB. In view of the tilt control, variations of the optical levels input to the optical amplifier 14 need to be restricted to ±1.0 dB with respect to the set value. With the optical communication device of the present invention, the VOA characteristics are linearized to suppress variations in the optical level among wavelengths attributable to the VOA characteristics, and accordingly, variations of the optical levels input to the optical amplifier 14 can be restricted to ±1.0 dB.

A second embodiment of the present invention will be now described in detail with reference to the drawings. The VOA characteristic has temperature dependence, and therefore, in the second embodiment, the VOA data table is prepared for each of different temperatures.

Figure 10:
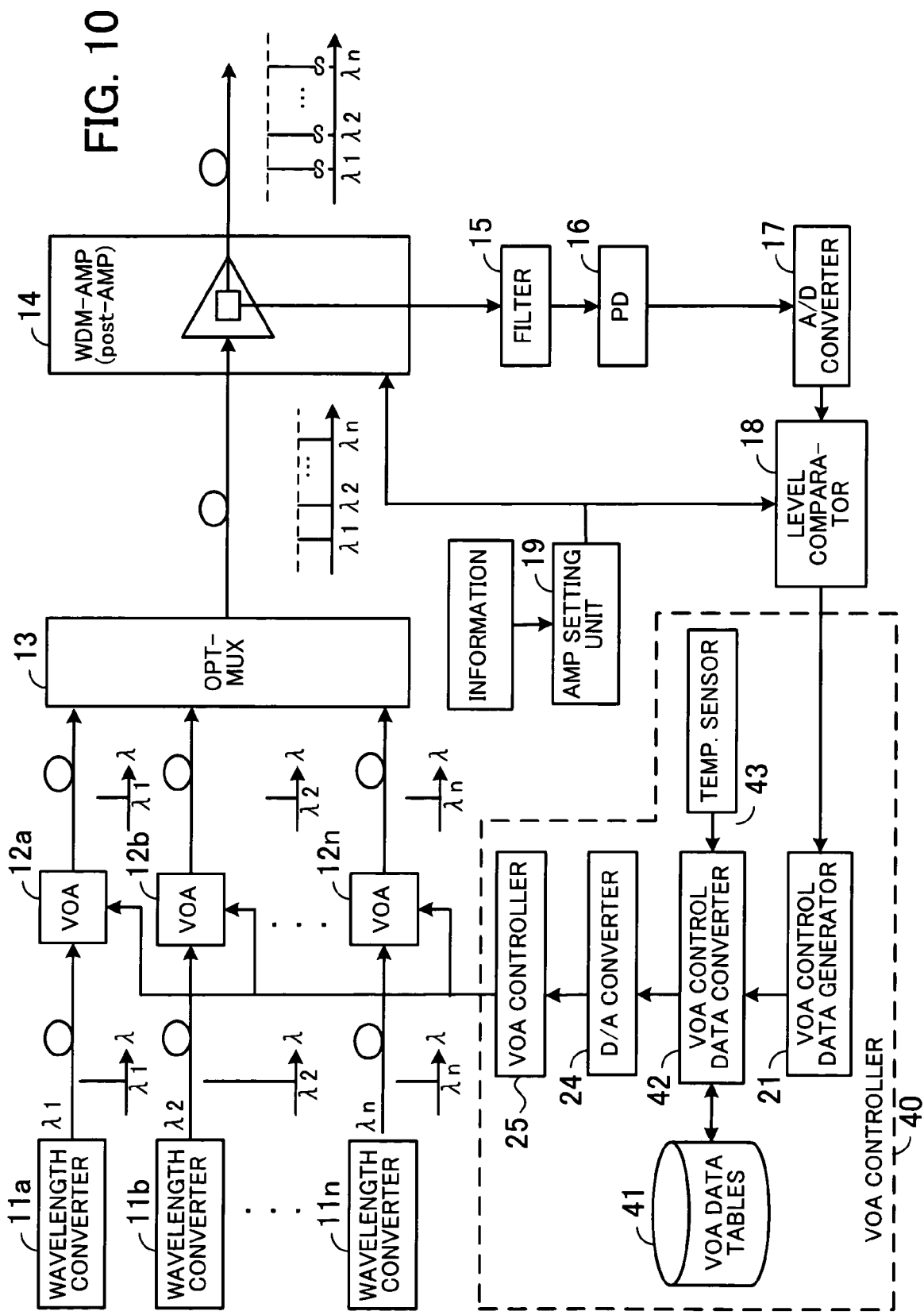
FIG. 10 is a block diagram of an optical communication device according to a second embodiment.

FIG. 10 is a block diagram of an optical communication device according to the second embodiment. In the figure, identical reference numerals are used to denote elements identical with those appearing in FIG. 2, and description of such elements is omitted.

As seen from FIG. 10, the second embodiment has a VOA controller 40 different from the counterpart of the first embodiment. The VOA controller 40 includes VOA data tables 41, a VOA control data converter 42, and a temperature sensor 43.

The VOA data tables 41 store data for converting the VOA control data so that the optical attenuation characteristics of the VOAs 12a, 12b, . . . , 12n may be linearized with respect to the VOA control data, and are prepared for respective different temperatures. The VOA data tables 41 are prepared for the respective temperatures by the method explained above with reference to FIGS. 6 to 8 with the use of the tool explained above with reference to FIG. 5.

The temperature sensor 43 detects temperature and notifies the VOA control data converter 42 of the detected temperature. The VOA control data converter 42 looks up the VOA data table 41 corresponding to the temperature detected by the temperature sensor 43, to convert the VOA control data.

Figure 11:
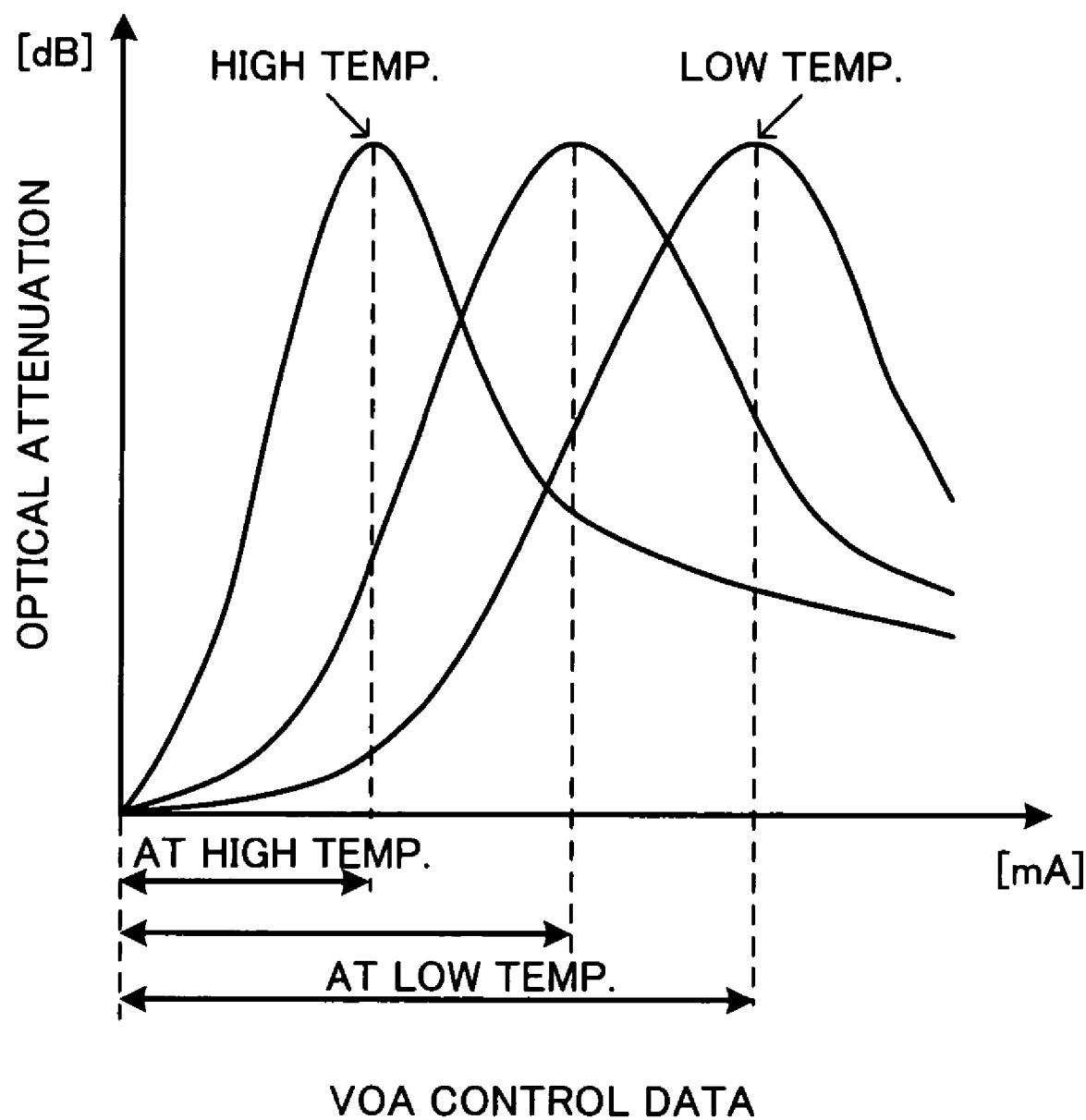
FIG. 11 illustrates optical attenuation characteristics of a VOA at different temperatures.

FIG. 11 shows optical attenuation characteristics of the VOA at different temperatures. As illustrated, the optical attenuation amount of the VOA varies depending on the temperature. For example, at high temperatures, the optical attenuation amount varies sharply relative to change in the VOA driving current, and at low temperatures, the optical attenuation amount varies gently relative to change in the VOA driving current.

Although the illustrated VOA characteristics differ from the VOA characteristic explained above with reference to the first embodiment, the VOA data tables are created for the linearization according to the same principles.

Figure 12:
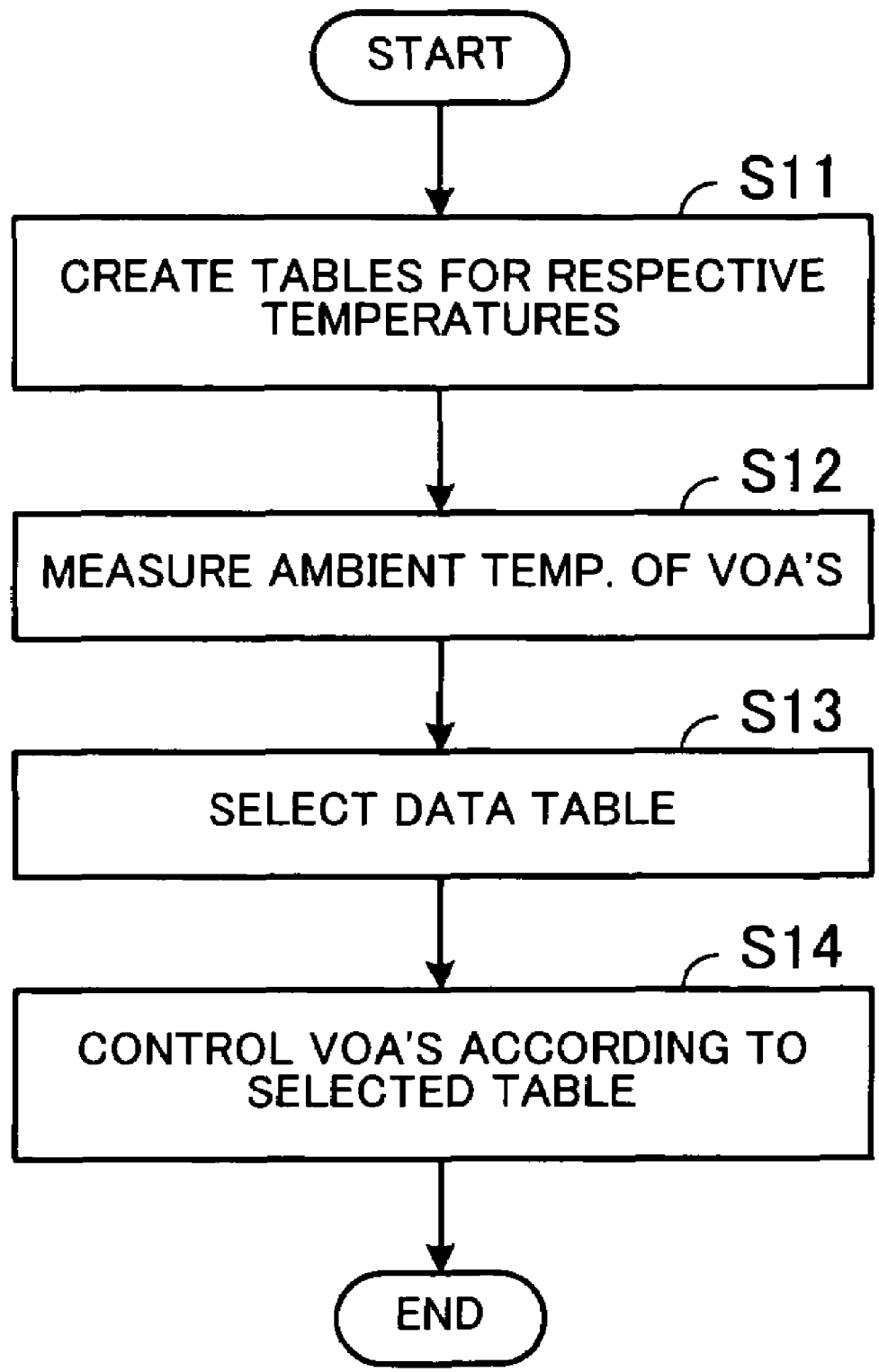
FIG. 12 is a flowchart illustrating operation of the optical communication device.

Referring now to the flowchart of FIG. 12, operation of the optical communication device will be described in which the VOAs are controlled in accordance with temperature.

Step S11: Using the tool explained above with reference to FIG. 5, the VOA data tables 41 for respective different temperatures are created.

Step S12: The optical communication device measures the ambient temperature of the VOAs 12a, 12b, . . . , 12n.

Step S13: The optical communication device selects the VOA data table 41 corresponding to the measured temperature.

Step S14: Using the selected VOA data table 41, the optical communication device controls the VOAs 12a, 12b, . . . , 12n. Steps S12 to S14 are thereafter repeatedly executed.

If, in the above instance, there is no VOA data table matching the temperature detected by the temperature sensor 43, the VOA control data converter 42 selects the VOA data table 41 associated with temperature close to the temperature detected by the temperature sensor 43, to carry out data conversion. Alternatively, where there is no VOA data table matching the temperature detected by the temperature sensor 43, the VOA data tables 41 associated with temperatures close to the detected temperature may be used to calculate conversion data for the detected temperature.

For example, suppose that there are three VOA data tables 41 prepared for 0° C., 20° C. and 40° C., respectively, and that the temperature detected by the temperature sensor 43 is 30° C. In this case, the VOA control data converter 42 acquires conversion data from the VOA data tables 41 associated with 20° C. and 40° C. and, based on the difference between the acquired data, calculates conversion data for 30° C.

Specifically, assuming that at 20° C., 10-mA VOA driving current is output based on the conversion data of the VOA data table 41 and that at 40° C., 6-mA VOA driving current is output based on the conversion data of the VOA data table 41, the VOA control data converter 42 performs the calculation: VOA driving current 6 mA at 40° C.+(VOA driving current 10 mA at 20° C.−VOA driving current 6 mA at 40° C.)×{(30° C.−20° C.)/(40° C.−20° C.)}=8 mA.

Figure 13:
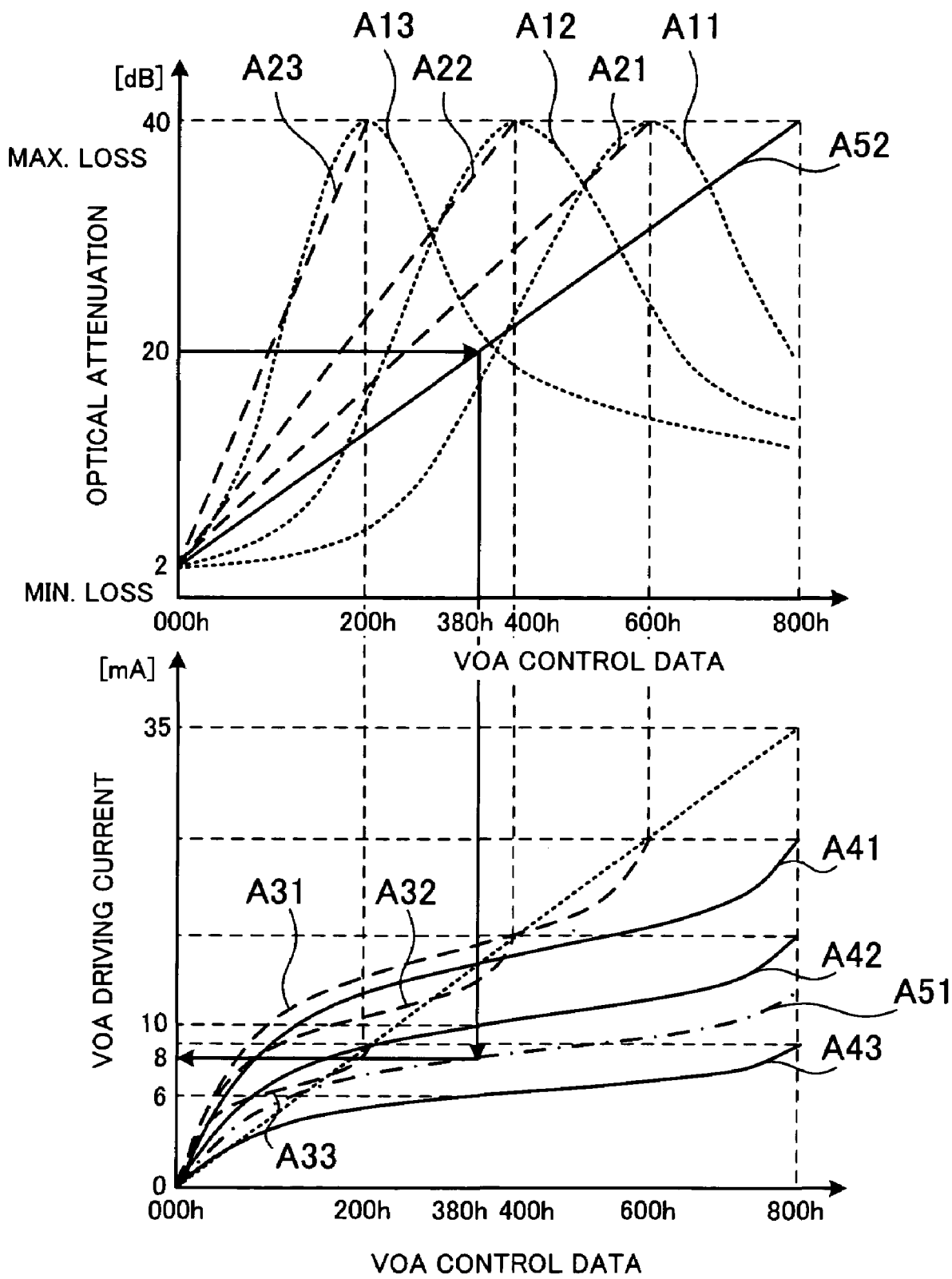
FIG. 13 illustrates VOA characteristics and VOA driving currents at different temperatures.
Figure 14:
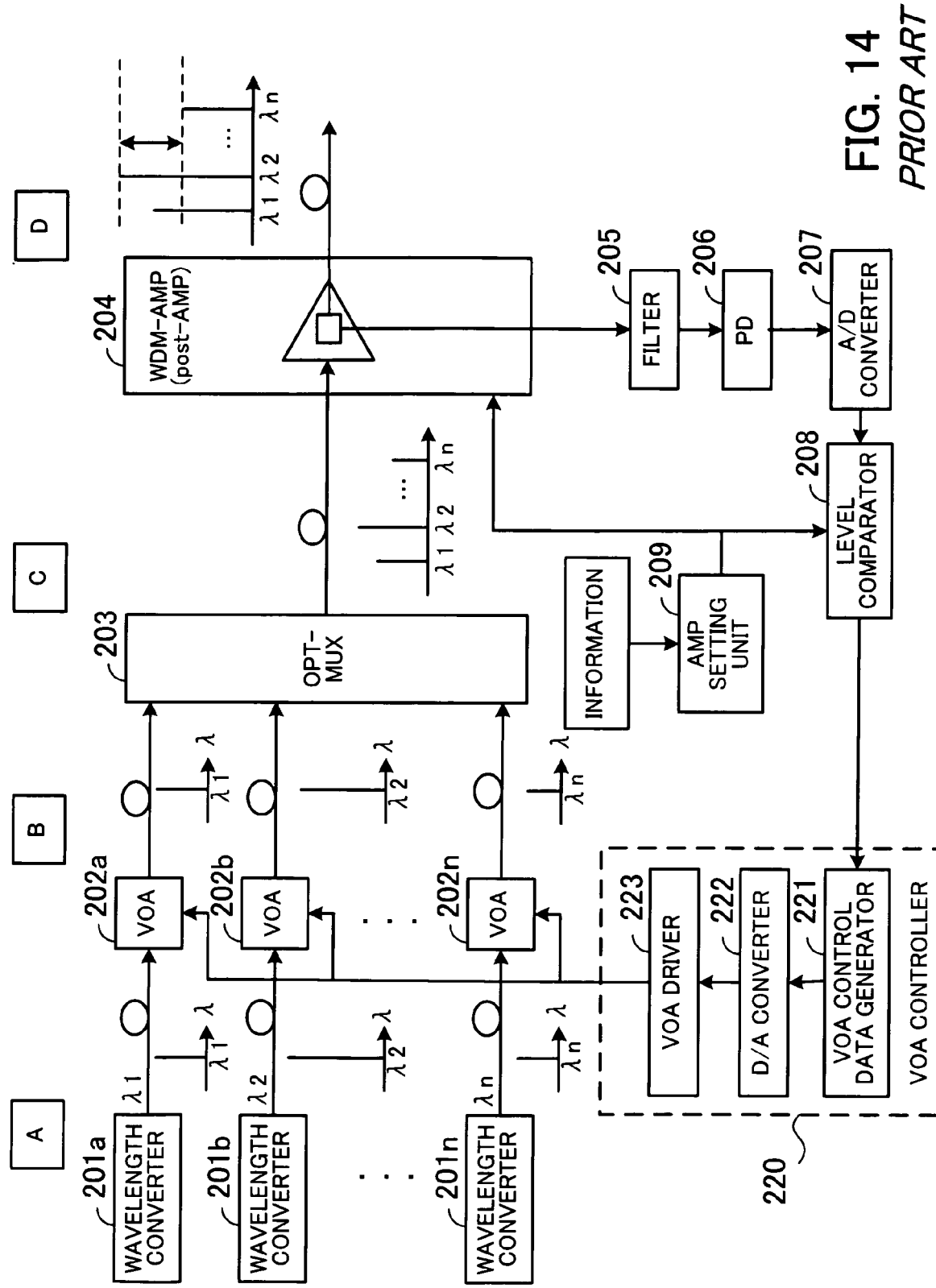
FIG. 14 is a block diagram of a conventional optical communication device.
Figure 15:
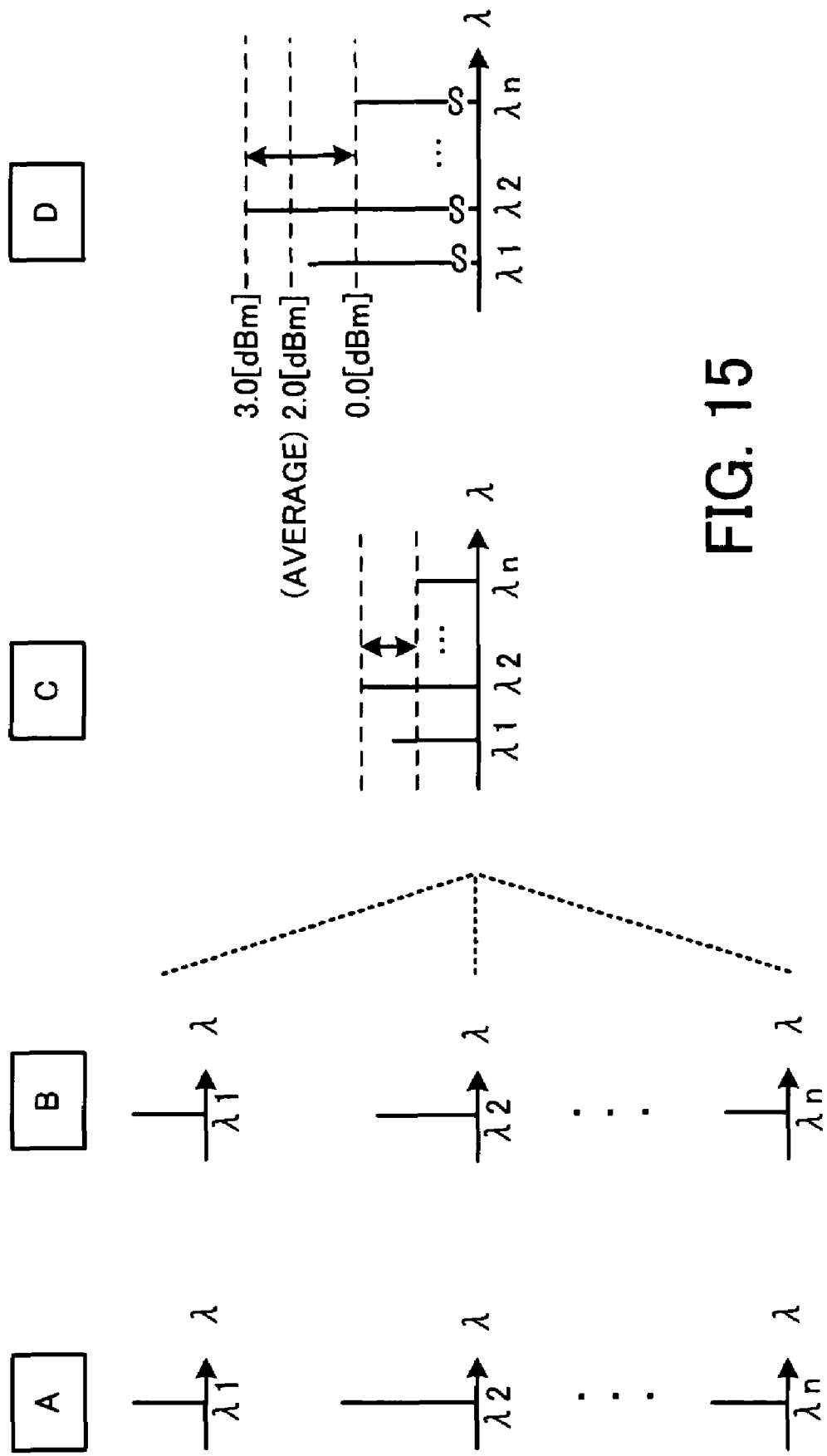
FIG. 15 illustrates variations in optical level among wavelengths.

FIG. 13 shows VOA characteristics and VOA driving currents at different temperatures. The upper graph shows VOA characteristics A11 to A13 at 0° C., 20° C. and 40° C., respectively, as well as VOA characteristics A21 to A23 derived in the middle of correction of the VOA data tables 41. The characteristics A21 to A23 are the VOA characteristics derived in the middle of correction; therefore, these characteristics are linear and the VOA control data is not corrected to full scale (000h through 800h).

The lower graph of FIG. 13 shows VOA driving current waveforms A31 to A33 derived in the middle of correction and associated with 0° C., 20° C. and 40° C., respectively, as well as VOA driving current waveforms A41 to A43 after the correction of the VOA data tables 41.

The VOA data tables 41 each store conversion data for converting data so that the VOA control data and the VOA driving current may have the relationship indicated by a corresponding one of the waveforms A41 to A43. The conversion data for 30° C. is calculated based on the difference between the conversion data for 20° C. and that for 40° C., and thus assumes a median value between the waveforms A42 and A43, as indicated by the waveform A51. The VOA characteristic at 30° C. is shown in the upper graph by the waveform A52.

By preparing the VOA data tables 41 for respective different temperatures, it is possible to properly control the VOAs even in the case where the VOA characteristics have dependence on temperature.

Even if there is no VOA data table matching the detected temperature, the conversion data can be calculated from the VOA data tables 41 associated with temperatures close to the detected temperature, thus making it possible to carry out proper control and also to reduce the amount of data held by the VOA data tables 41.

The optical communication device of the present invention is provided with the data table for converting the optical signal control data to the optical attenuation data so that the optical attenuation amounts of the optical attenuators may be linearized with respect to the optical signal control data based on the differences between the set optical level and the optical levels of the respective wavelengths input to the optical amplifier. The data table is looked up to convert the optical signal control data to the optical attenuation data, and the data obtained is output to the optical attenuators. Since the optical attenuation amounts of the optical attenuators vary linearly with respect to the optical signal control data, wavelength-dependent variations of the optical levels output from the optical attenuators can be suppressed, thus enabling long-distance transmission.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. An optical communication device for multiplexing optical signals for communication, comprising:
    a plurality of optical attenuator means for attenuating the optical signals of respective wavelengths in accordance with optical attenuation data;
    optical multiplexer means for multiplexing the optical signals;
    optical amplifier means for amplifying the multiplexed optical signal;
    control data output means for outputting optical signal control data based on differences between a set optical level and optical levels of the respective wavelengths input to the optical amplifier means;
    a plurality of data tables corresponding to different temperatures, each data table holding data for converting the optical signal control data to the optical attenuation data for use at a specific temperature so that optical attenuation amounts of the optical attenuator means are linearized with respect to the optical signal control data;
    temperature sensor means for detecting temperature; and
    control data converter means for converting the optical signal control data to the optical attenuation data by looking up one of the data tables that corresponds to the detected temperature and outputting the obtained data to the optical attenuator means.

2. The optical communication device according to claim 1, wherein the data tables are generated by data table generator means external to the optical communication device.

3. The optical communication device according to claim 2, wherein the data table generator means generates the data tables in which the optical attenuation data is linearized with respect to the optical signal control data, and acquires an optical attenuation characteristic of the optical attenuator means based on the generated data tables.

4. The optical communication device according to claim 3, wherein the data table generator means generates, based on the optical attenuation characteristic of the optical attenuator means, the data tables in which the optical attenuation amounts of the optical attenuator means are linearized with respect to the optical signal control data.

5. An optical communication device for multiplexing optical signals for communication, comprising:
    a plurality of optical attenuator means for attenuating the optical signals of respective wavelengths in accordance with optical attenuation data;
    optical multiplexer means for multiplexing the optical signals;
    optical amplifier means for amplifying the multiplexed optical signal;
    control data output means for outputting optical signal control data based on differences between a set optical level and optical levels of the respective wavelengths input to the optical amplifier means;
    a plurality of data tables corresponding to different temperatures, each data table holding data for converting the optical signal control data to the optical attenuation data for use at a specific temperature so that optical attenuation amounts of the optical attenuator means are linearized with respect to the optical signal control data;
    temperature sensor means for detecting temperature; and
    control data converter means for converting the optical signal control data to the optical attenuation data by looking up one of the data tables that corresponds to the detected temperature and outputting the obtained data to the optical attenuator means,
    wherein, if there is no data table matching the detected temperature, the control data converter means calculates the optical attenuation data for the detected temperature by using the data table prepared for temperature close to the detected temperature.

6. An optical communication device for multiplexing optical signals for communication, comprising:
    a plurality of optical attenuators to attenuate the optical signals of respective wavelengths in accordance with optical attenuation data;
    an optical multiplexer to multiplex the optical signals supplied from the optical attenuators;
    an optical amplifier to amplify the multiplexed optical signal;
    a control data output unit to output optical signal control data based on differences between a set optical level and optical levels of the respective wavelengths input to the optical amplifier;
    a plurality of data tables corresponding to different temperatures, each data table holding data for converting the optical signal control data to the optical attenuation data for use at a specific temperature so that optical attenuation amounts of the optical attenuators are linearized with respect to the optical signal control data;
    a temperature sensor to detect temperature; and
    a control data converter to convert the optical signal control data to the optical attenuation data by looking up one of the data tables that corresponds to the detected temperature and output the obtained data to the optical attenuators.

* * * * *